April 22, 1958
G. E. MILLS
2,831,698
JANITOR'S CART
Filed Nov. 29, 1956
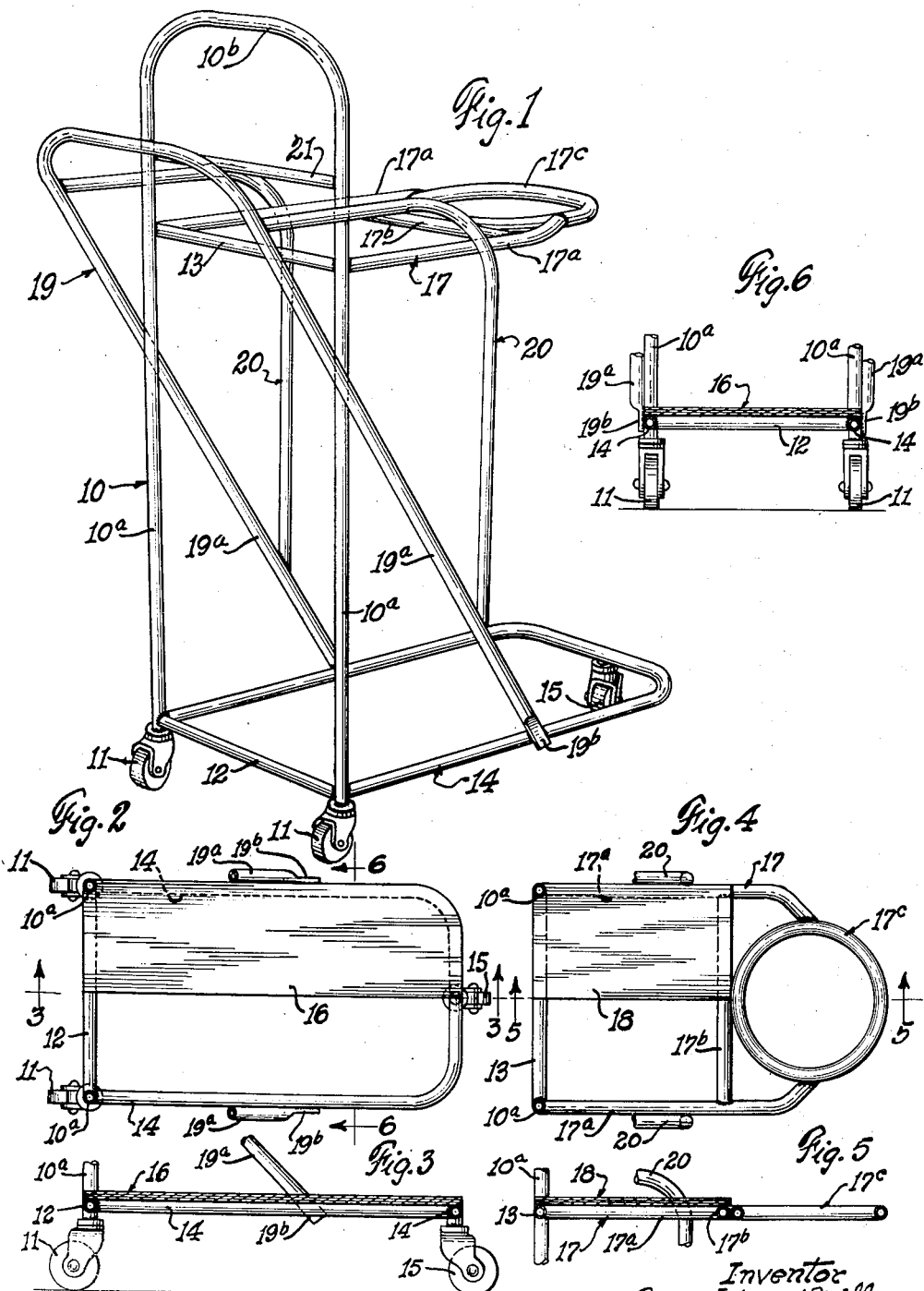
Inventor
George Edward Mills
By Frank J. Schraeder Jr.
Attorney ated Apr. 22, 1958

2,831,698
JANITOR'S CART
George E. Mills, Wichita, Kans.

Application November 29, 1956, Serial No. 625,169

1 Claim. (Cl. 280—47.35)

This invention relates generally to new and useful improvements in utility conveyances and has particular reference to an improved cart for the convenience of janitors engaged in the cleaning of offices in large multi-story buildings.

The various offices, rooms and halls of large office and industrial buildings are usually cleaned every day to remove waste materials, sweep, dust and in other ways render the offices clean and sanitary for use on the succeeding business day. This cleaning operation is usually performed at the end of a business day and involves the use of pails, vacuum sweepers, mops, brooms, dusters, glass and furniture cleaning and polishing materials all of which must be moved from one office to another.

My improved cart facilitates such cleaning operations by providing a convenient means for compactly carrying the necessary cleaning implements and materials during their movement from office to office thus contributing very substantially to the efficiency of the workers and economizing time and labor.

A primary object of my invention resides in the provision of a janitor's portable cart which is simple and rigid in construction employing a minimum of simple parts embodied in a tubular frame structure which is light in weight, durable in use, and comparatively low in cost of production.

Another object of my invention is found in the provision of a janitor's portable utility cart which is neat in appearance, narrow in width so as to pass through usual office door openings when loaded with the necessary cleaning equipment and materials, and which cart is provided with a suitable platform for carrying a vacuum sweeper and an elevated shelf for various cleaning materials; the platform and shelf being supported on structural members forming part of the cart structure.

Still another object of the invention resides in the novel construction of the structural frame of the wheel-supported cart; such frame consisting entirely of tubular and preferably light-weight material such as aluminum.

The various features of novelty whereby the present invention is characterized will hereinafter be pointed out with particularity in the claim; but, for a full understanding of the invention and its objects and advantages, reference may be had to the following description taken in connection with the accompanying drawing wherein is illustrated a janitor's cart embodying a preferred form of my invention. In the drawing:

Fig. 1 is a perspective view of the cart frame structure;

Fig. 2 is a horizontal section through a lower portion of the cart showing in plan view a half portion of the platform supported on the lower frame;

Fig. 3 is a vertical section through the platform taken on line 3—3 of Fig. 2;

Fig. 4 is a horizontal section through an upper portion of the cart showing in plan view a half portion of the elevated shelf;

Fig. 5 is a vertical section through the elevated shelf taken on line 5—5 of Fig. 4; and Fig. 6 is a horizontal cross-section of the platform taken on line 6—6 of Fig. 2.

The improved janitor's cart as shown on the accompanying drawing comprises a vertically disposed inverted U-shaped frame generally designated by numeral 10 and consisting of vertical legs 10a integrally connected at their upper ends by a transverse frame portion 10b having preferably curved end portions formed integrally with the upper portions of the legs 10a. A caster wheel 11 is mounted below the bottom of each leg 10a preferably with the stems of the casters secured within the tubular ends of the legs.

The inverted U-shaped frame 10 is reenforced structurally with a horizontal tubular strut 12 suitably secured to the lower ends of the legs 10a, as by welding, just above the tops of the caster wheels 11. A similar tubular horizontal upper strut 13 is welded at its ends to and within the upper portions of the legs 10a.

The base frame 14 consists of a horizontally disposed U-shaped tubular member having the ends thereof connected, as by welding, to the bottom ends of the legs 10a and being supported at its front end on a caster 15 and laterally plane-aligned with the horizontal strut 12; the base frame 14 comprising a support for the platform 16 which is conveniently adapted to function as a support for a vacuum sweeper.

A shelf-supporting frame, generally designated by numeral 17, extends laterally from the U-shaped vertical frame 10 in plane-alignment with the upper horizontal strut 13 and carries a circular tubular member 17c on the outer ends of the laterally spaced horizontally disposed pair of tubular arms 17a having their inner ends secured to the legs 10a as by welding; there being a lateral strut 17b disposed adjacent to the side of the circular member 17c and securely interconnecting the arms 17a. The strut 17b is welded to the ring 17c and at its ends to the arms 17a and these elements together with the strut 13 carry the shelf 18 in elevated position above the vacuum sweeper supporting platform 16 whereby such shelf 18 is adapted conveniently to function as a support for a tray containing various cleaning equipment and materials such as, for example, brushes, furniture polish, glass cleaning fluid and polishing and dusting cloths and the like; the ring 17c constituting a support for a water pail.

The cart is movable on the three casters 11 and 15 and steerable by a handle 19 of tubular material and U-shaped form disposed obliquely to the vertical axis of the cart with the medial portions of its legs 19a embracing, and welded to, the outer sides of the medial portions of the frame legs 10a and its ends 19b preferably flattened and welded to the outer sides of the base frame 14. It should be noted that the lower portions of the handle legs 19a and the lower portions of the frame legs 10a together with the rear portions of the base frame 14 form triangular side structures which reenforce and stabilize the cart frame.

Additional reenforcement and stabilization of the cart is attained by the provision of a pair of tubular inverted L-shaped members 20 having ends welded to the upper and lower medial portions of the handle legs 19a and having intermediate portions welded to the arms 17a and to the upper portions of the frame legs 10a.

The platform 16 and shelf 18 are preferably made of plywood; the platform 16 being frictionally retained on base frame 14 confined between the legs 10a and 19a and the shelf 18 being frictionally retained on frame 17 confined between the legs 10a and side members 20.

Additional reenforcement may be provided by a tubular strut 21 interposed between and welded to the upper portions of legs 10a above the plane of strut 13.

It should be noted that the rear strut 21 and the medial portions of the inverted L-shaped side members 20 function, in addition to their structural reenforcement of the cart, as guard rails for a cleaning equipment tray or the like supported on shelf 18.

The foregoing description and accompanying drawing clearly disclose a preferred embodiment of my invention but it will be understood that this disclosure is merely illustrative and that slight changes in the details of construction and arrangement of the parts and members may be made by those skilled in the art to which this invention pertains without departing from the scope and spirit of the invention defined in the hereto appended claim.

I claim:

In a janitor's utility cart, a structure composed of tubular members comprising an inverted U-shaped vertically disposed frame, a caster carried at the bottom end of each leg of said vertically disposed frame, a lateral strut rigidly interconnecting the lower ends of said legs of said vertically disposed frame, a horizontally disposed U-shaped base frame comprising a pair of parallel tubular members integrally connected by a transverse portion and the ends of said parallel tubular members rigidly secured to the lower ends of said legs of said vertically disposed frame, a caster carried on said transverse portion of said base frame, a platform carried on said base frame, an elevated shelf frame comprising a pair of laterally spaced horizontally disposed arms having corresponding ends rigidly secured to the upper portions of the legs of said vertically disposed frame, a lateral strut rigidly interconnecting the upper portions of the legs of said vertically disposed frame within the lateral plane of said arms of said shelf, a ring-shaped member carried on the outer ends of said arms, a shelf carried on said shelf frame, a U-shaped handle for the cart having parallel legs disposed obliquely to the vertical axis of the cart with medial portions of said handle legs rigidly secured to and embracing the outer sides of the legs of said vertical frame and the ends of said handle legs rigidly secured to the sides of said base frame, and a pair of inverted L-shaped members having corresponding pairs of ends rigidly secured to respectively upper and lower medial portions of said handle legs and intermediate portions rigidly secured to the upper portions of the legs of said vertical frame and to said arms of said shelf frame.

References Cited in the file of this patent

UNITED STATES PATENTS

| | | |
|---|---|---|
| 1,896,249 | Russell | Feb. 7, 1933 |
| 2,311,422 | Walling | Feb. 16, 1943 |
| 2,583,644 | Grimes | Jan. 29, 1952 |
| 2,607,945 | Fontaine | Aug. 26, 1952 |
| 2,764,419 | Enders | Sept. 25, 1956 |